United States Patent [19]
Nozaki et al.

[11] Patent Number: 4,797,566
[45] Date of Patent: Jan. 10, 1989

[54] ENERGY STORING APPARATUS

[75] Inventors: Ken Nozaki; Yuichi Akai, both of Ibaragi, Japan

[73] Assignees: Agency of Industrial Science and Technology; Ebara Corporation, both of Tokyo, Japan

[21] Appl. No.: 19,621

[22] Filed: Feb. 27, 1987

[30] Foreign Application Priority Data

Feb. 27, 1986 [JP] Japan ................... 61-40361

[51] Int. Cl.⁴ .................... H02J 9/04; H01M 8/20
[52] U.S. Cl. ........................ 307/43; 307/66; 290/1 R; 323/906; 429/101; 429/105; 60/659
[58] Field of Search .............. 307/43, 46, 48, 66, 307/64; 322/4; 290/1 R, 45, 46, 55, 2 R, 4 R; 429/101, 109, 202, 111, 209, 205, 5, 107; 60/641.1, 652, 659, 669, 650, 641.6; 323/906; 320/45 R

[56] References Cited

U.S. PATENT DOCUMENTS

| | | | |
|---|---|---|---|
| 3,600,599 | 8/1971 | Wright | 323/906 X |
| 3,696,286 | 10/1972 | Ule | 323/906 X |
| 3,816,804 | 6/1974 | Cardwell, Jr. | 307/66 X |
| 3,965,683 | 6/1976 | Dix | 60/659 X |
| 4,079,591 | 3/1978 | Derby et al. | 290/1 R X |
| 4,171,491 | 10/1979 | Theyse | 290/1 R |
| 4,175,249 | 11/1979 | Gruber | 323/906 X |
| 4,182,960 | 1/1980 | Reuyl | 290/1 R |
| 4,281,278 | 7/1981 | Bilsky et al. | 323/906 X |
| 4,315,163 | 2/1982 | Bienville | 307/66 |
| 4,362,791 | 12/1982 | Kaneko et al. | 429/101 |
| 4,485,154 | 11/1984 | Remick et al. | 429/105 X |
| 4,494,063 | 1/1985 | Callen et al. | 307/66 X |
| 4,575,679 | 3/1986 | Chung et al. | 323/906 X |
| 4,604,567 | 8/1986 | Chetty | 323/906 X |

FOREIGN PATENT DOCUMENTS

| | | |
|---|---|---|
| 52-102887 | 8/1977 | Japan . |
| 56-42970 | 4/1981 | Japan . |
| 57-9072 | 1/1982 | Japan . |
| 57-9073 | 1/1982 | Japan . |
| 57-180081 | 11/1982 | Japan . |
| 58-163440 | 9/1983 | Japan . |
| 58-176880 | 10/1983 | Japan . |
| 58-177483 | 10/1983 | Japan . |
| 59-127378 | 7/1984 | Japan . |
| 59-126782 | 7/1984 | Japan . |
| 60-37652 | 2/1985 | Japan . |
| 60-37674 | 2/1985 | Japan . |
| 60-70672 | 4/1985 | Japan . |
| 60-115459 | 8/1985 | Japan . |
| 60-148068 | 8/1985 | Japan . |
| 60-167283 | 8/1985 | Japan . |
| 61-24172 | 2/1986 | Japan . |

OTHER PUBLICATIONS

Hagedorn, Norman H.; Thaller, Lawrence H.: Design Flexibility of Redox Flow Systems, DOE/NASA/127-26-16, NASA TM-82854, 1982.
Hagedorn, Norman H: NASA Redox Storage System Development Project Final Report, DOE/NASA/127-26-24, NASA TM-83677, 1984.

Primary Examiner—William M. Shoop, Jr.
Assistant Examiner—Paul Ip
Attorney, Agent, or Firm—Oblon, Fisher, Spivak, McClelland & Maier

[57] ABSTRACT

An electric energy storing apparatus comprising lead-acid storage battery means and flowing type battery means. The lead-acid storage battery means is connectable to power lines interconnecting electric power generating means and a load, and the flowing type battery is connectable to the lead-acid storage battery means in order to charge the storage battery means, execute an equalization charge, or act as an end cell for the storage battery means.

11 Claims, 4 Drawing Sheets

ENERGY STORING APPARATUS

BACKGROUND OF THE INVENTION

1. Field of the Invention

The present invention relates to an energy storing apparatus and, more particularly, to an energy storing apparatus for storing electric energy with a combination of a lead-acid storage battery and a flowing type battery.

2. Description of Related Prior Art

The proportion of total energy consumption accounted for by electric power has been increasing year by year, because the electric power can be easily converted into various forms of energy and can be easily controlled, while environmental pollution is not caused when electric power is consumed. A unique feature of electric power supply is that the production and consumption of electric energy are performed simultaneously. Under this technical limitation, it has been a major concern of those in the field of power technology to ensure that electric power of constant frequency, constant voltage, and high quality can be supplied with high reliability in conformity with variations in the total amount of electric power consumption. In the present situation, nuclear power generators or high efficiency coal/oil fired power generators are operated at a rated operating point which gives maximum efficiency at as high a level as possible, but though their generating efficiency is high, it is difficult to vary their output level. Thus hydraulic power generators or the like which are suitable for varying the amount of electric power supplied in conformity with variations in the amount of electric power consumption are also operated, thereby coping with a large increase in the demand for electric power in the daytime. The surplus electric power made available during the night by the more economical nuclear power plants or high efficiency coal/oil fired power generators is stored by way of pumped storage power generation. However, as the conditions for location of the plants for pumped storage power generation gradually become more restrictive, the power storing system which utilizes secondary batteries has been taken up.

On the other hand, it is considered that in addition to the conventional kinds of hydraulic power generation, thermal power generation and nuclear power generation, the amount of electric power supplied by solar photovoltaic power generation, wind power generation, or the like will also increase in the future. However, the amount of power generated by solar photovoltaic power generation, wind power generation, or the like is influenced by such factors as the sunshine and wind conditions prevailing. Therefore, at least on the ground, such types of solar photovoltaic and wind power generation cannot on their own become a sufficient source of power supply as a stable power supply source will only become available when they are combined with some other type of energy storing equipment.

Under the necessity, as mentioned above, for secondary batteries, many lead-acid storage batteries are used in association with solar photovoltaic power generation or the like. One other useful type of secondary battery which has been receiving attention is the battery which utilizes electrolyte flowing cells, i.e., the flowing type battery.

Kaneko et al's U.S. Pat. No. 4,362,791 patented on Dec. 7, 1982 and entitled "Redox Battery" discloses an outline of the principle of the redox flow battery as an example of the flowing type battery. This type of battery will now be described with reference to FIGS. 1 and 2.

FIG. 1 shows the state subsisting when an energy storage system using the redox flow battery is being charged.

FIG. 2 shows the state subsisting when the system is discharged.

In these figures, reference numeral 1 denotes a power generating station; 2 a substation; 3 a load; 4 an inverter/converter; and 5 a redox battery. The redox battery 5 comprises: tanks 6a, 6b 7a and 7b; pumps 8 and 9; and a flow cell 10. The flow cell 10 includes a positive electrode 11, a negative electrode 12, and a diaphragm 13 isolating electrode 11 from electrode 12. Positive electrode liquid 14 and negative electrode liquid 15 are respectively contained in the left and right chambers divided by the diaphragm 13. In the example shown in FIGS. 1 and 2, the positive electrode liquid 14 is a hydrochloric acid solution containing Fe ions and the negative electrode liquid 15 is a hydrochloric acid solution containing Cr ions.

The operation will now be described.

The electric power generated by the power generating station 1 is transmitted to the substation 2 which transforms the voltage of the received electric power into the proper voltage and then supplies the power to the load 3. On the other hand, when the electric power becomes surplus during the night, the surplus electric power of AC is converted into DC power by the inverter/converter 4 and the DC power charges the redox battery 5. In this case, as shown in FIG. 1, the battery is charged while the positive and negative electrode liquids 14 and 15 are gradually transferred from the tank 6b to the tank 6a and from the tank 7a to the tank 7b by the pumps 8 and 9, respectively. Since the liquid containing Fe ions is used as the positive electrode liquid 14 and the liquid containing Cr ions is used as the negative electrode liquid 15, the reactions indicated as "Charge" in the following expressions (1) to (3) occur in the flow cell 10:

On the positive electrode side;

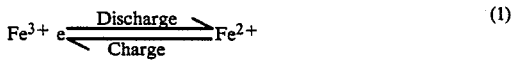

(1)

On the negative electrode side;

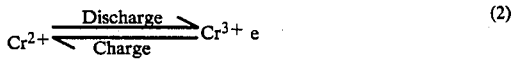

(2)

Whole reaction;

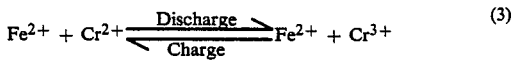

(3)

In this manner, the electric power is stored in the positive electrode liquid 14 and negative electrode liquid 15.

On the other hand, if the amount of power supplied is less than the amount demanded, the reactions indicated as "Discharge" in the above expressions (1) to (3) are executed, and the DC power is converted into AC power by the inverter/converter 4. The converted AC power is supplied to the load 3 through the substation 2.

Hitherto, many lead-acid storage batteries have been used for electric energy storing apparatus. However, in order to ensure that the performance of the lead-acid storage batteries is sufficient, it is necessary to perform an equalization charge, recovery charge, and the like for maintenance of the batteries. These charging operations must be performed at a voltage higher than the rated voltage of the lead-acid storage battery to be charged.

On the other hand, solar photovoltaic power generating elements are of such a nature that when they generates electric power at a voltage only slightly higher than the voltage at which power generation is performed at high efficiency, their power generating efficiency deteriorates remarkably. As a result the current value is greatly reduced or power generation cannot be performed at all. Therefore, in the case of using lead-acid storage batteries as the energy storing batteries for solar photovoltaic power generation, the rated voltage of the lead-acid storage batteries is set in accordance with the voltage for efficient solar photovoltaic power generation. Accordingly, unless a switching connection in the solar photovoltaic power generating panels is provided, it is impossible to perform the necessary equalization charge and recovery charge of the lead-acid storage batteries by means of the electric power produced by the solar photovoltaic power generation.

Further, if the lead-acid storage batteries are used as the energy storing apparatus, the discharge voltage decreases as the lead-acid storage batteries discharge. However, unless the particular load allows for a decrease in the discharge voltage, the end cell system is used as one method whereby any decrease in the voltage of the power to be supplied to the load may be set within an allowable range. The end cell system is a method whereby an additional battery called an end cell is connected in series with a lead-acid storage battery, thereby compensating for decreases in the discharge voltage of the lead-acid storage battery. In this case, however, another apparatus for charging the end cell is also needed.

SUMMARY OF THE INVENTION

It is a first object of the present invention to solve the above-stated problems.

It is a second object of the present invention to provide a novel electric energy storing apparatus which enables lead-acid batteries to be charged whenever charging is needed.

It is a third object of the present invention to provide a novel electric energy storing apparatus which makes it possible to execute an equalization charge and recovery charge for lead-acid storage batteries.

It is a fourth object of the present invention to provide a novel electric energy storing apparatus which enables the decrease in discharge voltage of lead-acid storage batteries to be compensated for.

In order to accomplish these objects, the electric energy storing apparatus of the present invention comprises lead-acid storage battery means and flowing type battery means. The storage battery means is connectable to power lines interconnecting electric power generating means and a load. The flowing type battery is provided to be connectable to the lead-acid storage batteries in order to charge the storage batteries, execute equalization charge and the like, or act as an end cell for the storage batteries.

When the electric energy output from the electric power generating means is larger than the energy consumed by the load, the surplus electric energy charges the lead-acid battery means. On the other hand, when the load needs the electric energy more than the energy supplied from the electric power generating means, the lead-acid storage battery means supplies the electric energy stored therein to the load.

DESCRIPTION OF THE PREFERRED EMBODIMENT

An embodiment according to the present invention will be described in detail with reference to FIGS. 3-5.

Figure 1:
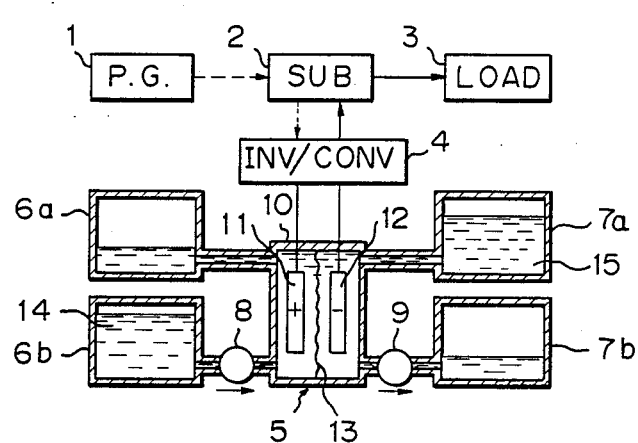
FIGS. 1 and 2 are diagrams explaining the theory of a redox flow battery used for an energy storage system, showing the charging state and the discharging state, respectively.
Figure 2:
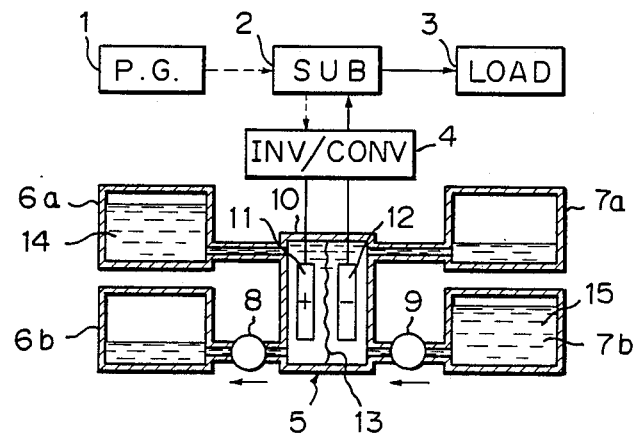
Figure 3:
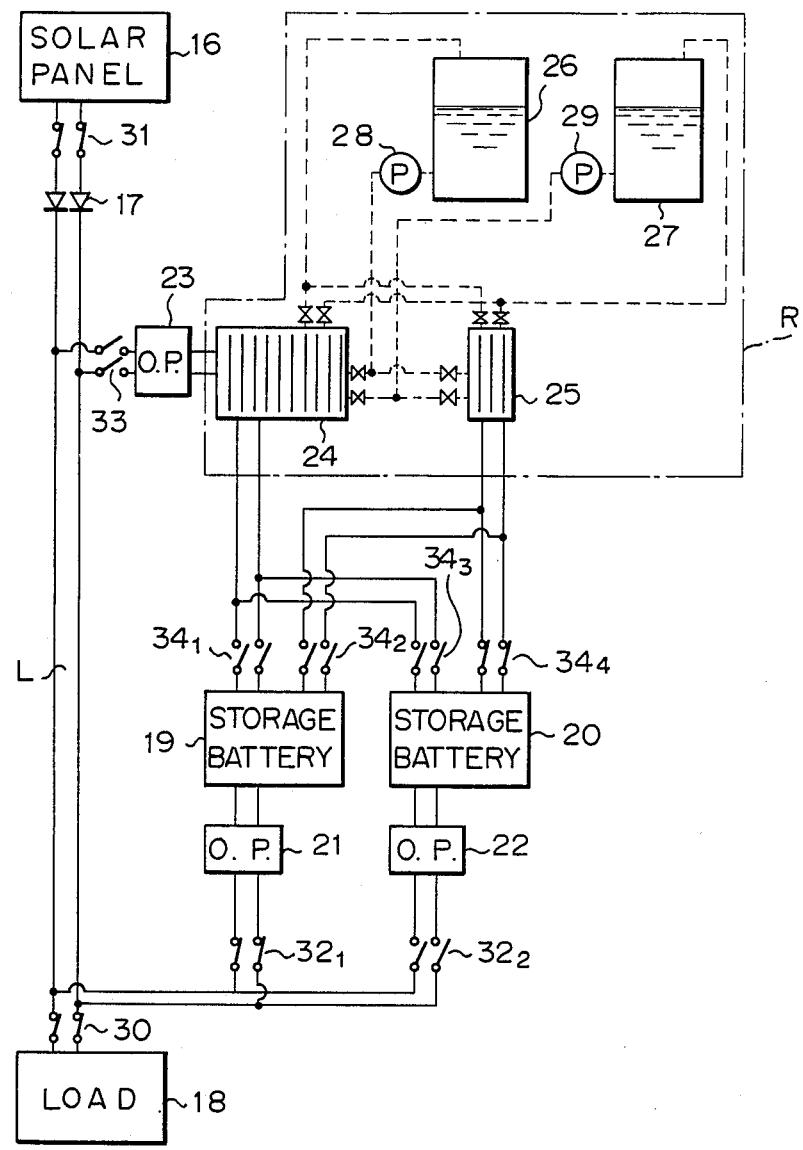
FIG. 3 shows an embodiment of an electric energy storing apparatus according to the present invention.

FIG. 3 is a systematic diagram of an electric energy supply system including a solar photovoltaic power generation panel and an electric energy storing apparatus in which are incorporated lead-acid storage batteries and a redox flow battery, which is one type of electrolyte flowing type battery that may be used.

In this figure, solar photovoltaic power generating panel 16 is connected through switch 31 and reverse current blocking diodes 17 to load 18 by means of power lines L. Normal-on switch 30 is preferably inserted between one end of power lines L and the load 18. The rated output of solar photovoltaic power generating panel 16 is, for example, 800 Wp. The load 18 is, for example, a DC continuous load of 72 W.

Two lead-acid storage batteries 19, 20 are respectively connected through switches $32_1$ and $32_2$ and overcharge preventing devices 21 and 22 to load 18. The rated output of these storage batteries is, for example, 16 V and 360 Ahr.

Redox flow battery R is connected through switch 33 and overcharge preventing device 23 to the portion of power lines L between diodes 17 and load 18. Redox flow battery R comprises stacks of flow cells 24 and 25, positive electrode liquid tank 26 and negative electrode liquid tank 27. Both stacks of flow cells 24 and 25 are connected to each other by means of piping, and each stack of flow cells is connected to tanks 26 and 27 also by means of piping. The piping work is indicated by broken lines. The reference numerals 28 and 29 designate pumps for delivering the liquids. Valves are suitably provided in the piping. With respect to redox flow battery R, one stack of flow cells 24 is set, for example, to 18 V and 90 W, and the other stack of flow cells 25 is set, for example, to 2.7 V and 13.5 W. The capacity of a couple of the positive and negative liquid tanks is 0.30 KWhr.

Redox flow battery R is also connected through switches $34_1$, $34_2$, $34_3$ and $34_4$ to lead-acid storage batteries 19 and 20. More specifically, a stack of flow cells 24 is connected through switch $34_1$ to lead-acid storage battery 19, and through switch $34_3$ to lead-acid storage battery 20. Another stack of flow cells 25 is connected through switch $34_2$ to lead-acid storage battery 19, and through switch $34_4$ to lead-acid storage battery 20.

Operation of the electric energy supply system will now be explained in detail.

When the output energy from solar photovoltaic power generating panel 16 is larger than the energy consumed by load 18 in the electric energy supply system, panel 16 supplies energy to load 18 with switch 31 close, and simultaneously, by further closing switches $32_1$ and $32_2$, lead-acid storage batteries 19 and 20 are charged by the surplus energy, that is, the difference between the energy supplied by panel 16 and the energy consumed by load 18. In addition to switches $32_1$ and $32_2$, when switch 33 is closed, the surplus energy charges redox battery R and lead-acid storage batteries 19 and 20. Redox battery R itself is a power storing battery similar to the lead-acid storage battery. Therefore, the whole energy storage capacity of the apparatus is equal to the total capacity of redox battery R and lead-acid storage batteries 19 and 20.

If the energy used in load 18 is larger than the energy supplied from power generating panel 16, load 18 is supplied with the electric energy from panel 16 and batteries 19 and 20 by closing switches 31, $32_1$ and $32_2$. While discharging, lead-acid storage batteries 19 and 20 can be charged by redox battery R when switches $34_1$ and $34_3$ are selectively closed.

If solar photovoltaic power generating panel 16 does not generate any power due to, for example, the lack of sunshine, and lead-acid storage batteries 19 and 20 have discharged, redox battery R can supply energy to load 18 if switch 33 is closed.

In the electric power supply system shown in FIG. 3, an equalization charge can be performed for lead-acid storage batteries 19 and 20 by means of redox flow battery R. FIG. 4 shows an electric connection for equalization charging. In this figure, switches 31, $32_1$ and $34_3$ are closed, and switches $32_2$, 33, $34_1$ $34_2$ and $34_4$ are opened. In other words, load 18 is connected to power generating panel 16 and storage battery 19, and storage battery 20 is connected to the stack of flow cells 24.

Accordingly, storage battery 19 supplies the electric energy to load 18, or is charged by the surplus energy from power generating panel 16, depending on whether the energy consumed by load 18 is smaller than the energy output from power generating panel 16 or not. At the same time, an equalization charge is executed from the stack of flow cells 24 in redox battery R to storage battery 20. In a similar manner, storage battery 19 may be subjected to an equalization charge in the case where storage battery 20 is connected to load 18.

Thus, equalization charging of lead-acid storage batteries can be executed without using solar photovoltaic power generating panel 16 or other power sources. As is apparent from the explanation given above, the stack of flow cells 25 having a smaller output than the other stack of flow cells 24 is not used for equalization charges.

Figure 4:
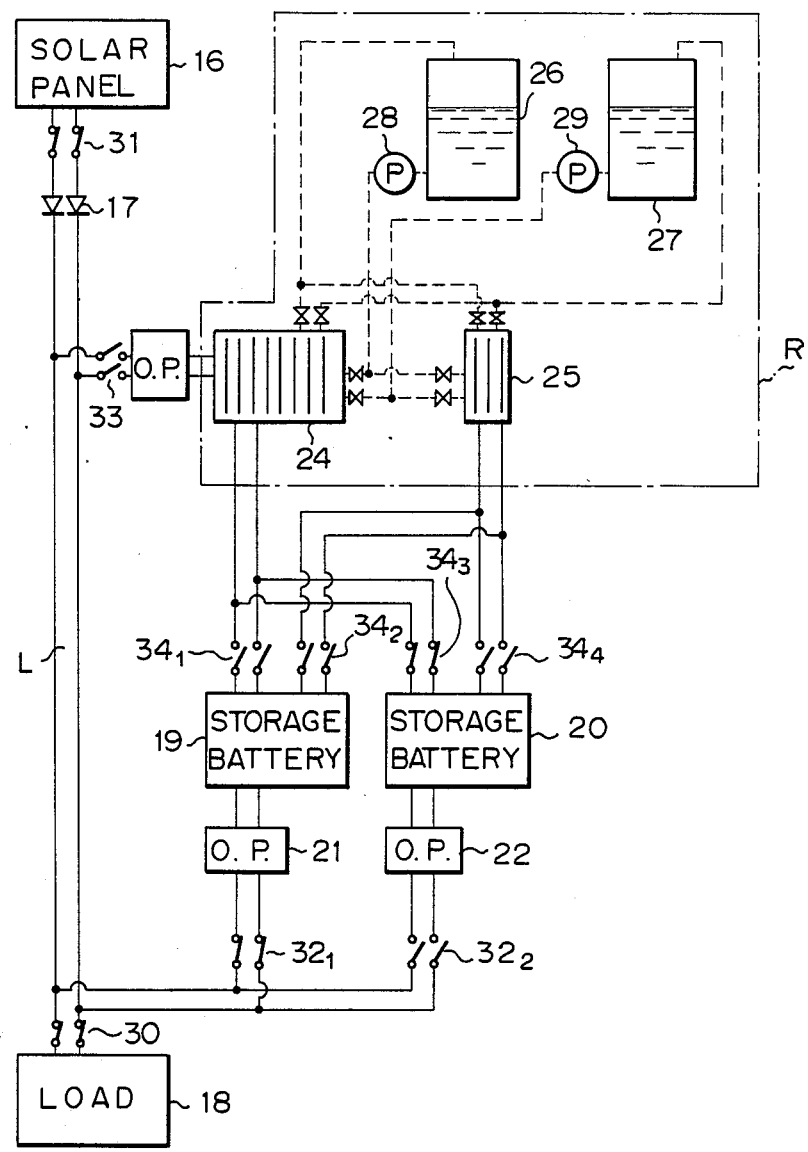
FIG. 4 shows how an equalization charge is executed in the electric energy storing apparatus shown in FIG. 3.
Figure 5:
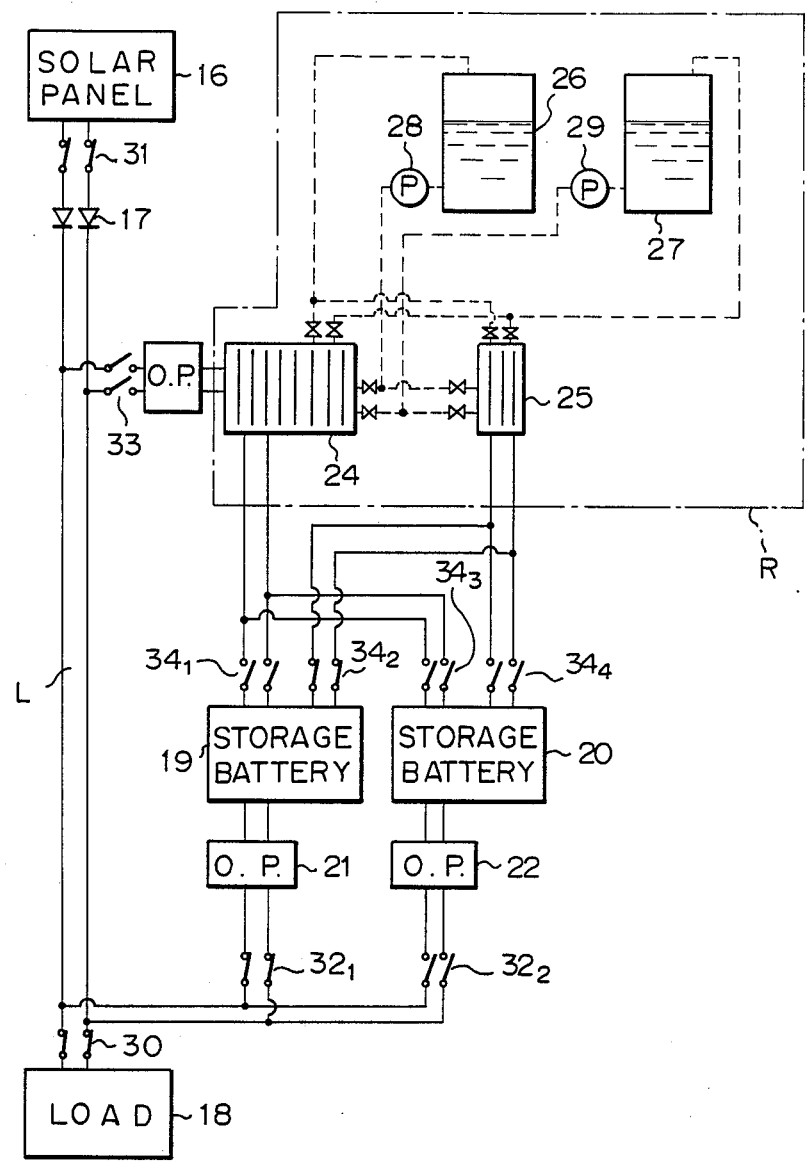
FIG. 5 shows an electric connection when a redox flow battery shown in FIG. 3 acts as an end cell.

The electric connection shown in FIG. 4 can also be used for recovery charges.

In the energy storing apparatus according to the present invention, redox battery R can also be used as an end cell for lead-acid storage battery 19 or 20. FIG. 5 shows an electric connection when one of the stacks of flow cells 25 in redox battery R is used as the end cell for lead-acid storage battery 19 or 20. In this figure, switches 31 and $32_1$ are closed and switches $32_2$ and 33 are opened, thus making an electric connection from solar photovoltaic power generating panel 16 and lead-acid storage battery 19 to load 18. In this state, it is assumed that the electric energy is being fed from panel 16 and battery 19 to load 18.

When the discharge voltage of battery 19 has decreased to a voltage insufficient for load 18, switch $34_2$ is closed and the stack of flow cells 25 of redox battery R is connected as the end cell in series with storage battery 19, thereby compensating for the decrease in the output voltage of lead-acid storage battery 19. It is obvious that storage battery 20 may be used and connected to stack of flow cells 25 by closing switch $34_4$ instead of storage battery 19.

As will be obvious from the description above, it is possible to use lead-acid storage battery 19 or 20 in the form of an "end cell system" coupled with redox flow battery R without providing another lead-acid storage battery serving as the end cell and the power source for charging thereof.

The following modifications or changes can be made to the embodiment of the present invention described heretofore:

1. In this embodiment, redox battery R includes two stacks of flow cells 24 and 25. Instead, one single stack of flow cells may be used for equalization charges and the like, and a suitable part of this stack of flow cells can be used as an end cell for lead-acid storage batteries;

2. The electric energy storing apparatus of this embodiment has two lead-acid storage batteries. The intention is that, in the case of normal charge or equalization charge, one storage battery can be charged while the other storage battery is discharging, thus enabling one storage battery to serve as a preliminary battery in preparation for the time where the other storage battery is dead. The present invention, however, can be applied to a case where one single lead-acid storage battery is provided. In this case, this storage battery performs charging and discharging alternately.

3. In electrically connecting redox battery R to lead-acid storage batteries 19 and 20 and load 18, it is possible to constitute a circuit in such a manner that these storage batteries and the load are connected in parallel to the stacks of flow cells of the redox battery. This enables the storage batteries to act in a floating-charge manner.

4. In the embodiment described above, the redox flow battery is used as a flowing type battery. This invention, however, can be applied to the combination of lead-acid storage batteries and any kind of flowing type battery including batteries whose positive electrode or negative electrode is the electrolyte flowing type electrode and batteries whose electrode active material is not electrolyte but gas.

5. In the present invention, the power generating source for supplying electric energy to the load is not limited to solar photovoltaic power generating panels. Instead of these, the present invention can employ an independent power equipment source such as a wind power generating apparatus.

6. It should be apparent to those skilled in the art that two stacks of flow cells may be simultaneously used, one for equalization charges and the other for an end cell.

While a preferred embodiment of the present invention has been described and illustrated herein, a person skilled in the art will appreciate that further changes and modifications may be made therein without departing from the spirit and scope of this invention as defined in the appended claims.

What is claimed is:

1. An energy storing apparatus including power generating means, a load and power lines interconnected between said electric power generating means and said load, comprising:

lead-acid storage battery means;
   flowing type battery means;
   first switch means for connecting said lead-acid battery means with said power lines;
   second switch means for connecting said flowing type battery means with said power lines;
   third switch means for connecting said lead-acid battery means with said flowing type battery means;
   wherein such first, second and third switch means are selectively operated so that said lead-acid battery means and said flowing type battery means are charged by surplus electric energy when the amount of electric energy supplied from said electric power generating means is larger than the amount of electric energy being consumed by said load, that said lead-acid battery means supplies the electric energy stored therein to said load when the amount of electric energy consumed by said load is larger than the amount of electric energy supplied from said electric energy generating means, and that said flowing type battery means operates to charge said lead-acid battery means.

2. An apparatus as claimed in claim 1 further comprising switch means for connecting said flowing type battery means to said power lines, wherein, when the switch means operates, said flowing type battery means is charged by said electric power generating means or discharges to said load.

3. An apparatus as claimed in claim 2 wherein said flowing type battery means is electrically connected to said lead-acid storage battery means for charging thereof.

4. An apparatus as claimed in claim 2 wherein said flowing type battery means is electrically connected to said lead-acid storage battery means for executing an equalization charge therefor.

5. An apparatus as claimed in claim 2 wherein said flowing type battery means is electrically connected to said lead-acid storage battery means so as to serve as an end cell, thereby compensating for any decrease in the discharge voltage of said lead-acid storage battery means.

6. An apparatus as claimed in claim 2 wherein said flowing type battery means simultaneously act for equalization charges and as an end cell.

7. An apparatus as claimed in claim 3 wherein said lead-acid storage battery means includes two lead-acid storage batteries, and these two lead-acid storage batteries are alternatively charged by said flowing type battery means.

8. An apparatus as claimed in claim 4 wherein said lead-acid storage battery means includes two lead-acid storage batteries, and one of the two storage batteries is subjected to an equalization charge while the other is connected to said load.

9. An apparatus as claimed in claim 5 wherein a part of said flowing type battery means is used for said end cell.

10. An apparatus as claimed in any one of the preceding claims wherein said flowing type battery means is an electrolyte flowing type battery.

11. An apparatus as claimed in claim 10 wherein said electrolyte flowing type battery is a redox battery.

* * * * *